United States Patent
Monogioudis

(10) Patent No.: US 8,787,351 B2
(45) Date of Patent: Jul. 22, 2014

(54) METHOD AND APPARATUS FOR SCHEDULING TRANSMISSIONS IN A COMMUNICATION NETWORK

(75) Inventor: Pantelis Monogioudis, Randolph, NJ (US)

(73) Assignee: Alcatel Lucent, Boulogne Billancourt (FR)

(*) Notice: Subject to any disclaimer, the term of this patent is extended or adjusted under 35 U.S.C. 154(b) by 275 days.

(21) Appl. No.: 13/086,685

(22) Filed: Apr. 14, 2011

(65) Prior Publication Data

US 2012/0263119 A1     Oct. 18, 2012

(51) Int. Cl.
*H04L 12/28* (2006.01)

(52) U.S. Cl.
USPC .......................................... 370/351

(58) Field of Classification Search
USPC .............. 370/351, 389, 395.1, 395.4, 395.42; 455/403, 422.1, 435.1, 435.2, 435.3; 709/204, 207
See application file for complete search history.

(56) References Cited

U.S. PATENT DOCUMENTS

| | | | |
|---|---|---|---|
| 6,611,522 B1* | 8/2003 | Zheng et al. | 370/395.21 |
| 7,263,377 B1* | 8/2007 | Wahlstrom et al. | 455/512 |
| 7,443,791 B2* | 10/2008 | Barrett et al. | 370/230 |
| 8,195,133 B2* | 6/2012 | Ramer et al. | 455/414.1 |
| 2003/0013451 A1 | 1/2003 | Walton | |
| 2004/0002341 A1* | 1/2004 | Chen | 455/453 |
| 2004/0208183 A1* | 10/2004 | Balachandran et al. | 370/395.21 |
| 2004/0228353 A1 | 11/2004 | Balachandran et al. | |
| 2005/0289312 A1* | 12/2005 | Ghosal et al. | 711/167 |
| 2008/0016310 A1* | 1/2008 | Ghosal et al. | 711/167 |
| 2008/0090563 A1* | 4/2008 | Chitrapu | 455/422.1 |
| 2010/0030597 A1* | 2/2010 | Lewis et al. | 705/7 |
| 2010/0217662 A1* | 8/2010 | Ramer et al. | 705/14.42 |
| 2012/0191628 A1* | 7/2012 | Bugenhagen | 705/400 |

FOREIGN PATENT DOCUMENTS

| | | |
|---|---|---|
| EP | 1 469 641 | 10/2004 |
| EP | 2 285 172 | 2/2011 |
| WO | WO 02/085061 | 10/2002 |

OTHER PUBLICATIONS

International Search Report/Written Opinion dated Jun. 21, 2012, issued in International Application No. PCT/US2012/032988.

* cited by examiner

*Primary Examiner* — Fan Ng

(74) *Attorney, Agent, or Firm* — Harness, Dickey & Pierce

(57) ABSTRACT

The method includes assigning a priority to a mobile unit based on a Quality of Service (QoS) class associated with the mobile unit and a score associated with a user of the mobile unit.

34 Claims, 3 Drawing Sheets

METHOD AND APPARATUS FOR SCHEDULING TRANSMISSIONS IN A COMMUNICATION NETWORK

BACKGROUND OF THE INVENTION

1. Field

Embodiments relate to scheduling transmissions in communication systems.

2. Related Art

A scheduler or scheduling function is provided in a base station controller in order to provide scheduling or management of system. In general, a scheduler selects a mobile for transmission at a given time instant, and adaptive modulation and coding allows selection of the appropriate transport format (modulation and coding) for the current channel conditions seen by the mobile.

Third and fourth generation wireless data communications systems, such as UMTS/HSPA CDMA-2000 standard systems, 1x-EV-DO, Long Term Evolution (LTE 3GPP 4G) WiMAX and WiFi, management of system resources is paramount. This is because properties of data differ significantly from properties of voice. For example, a data transmission, unlike a voice transmission, is not necessarily continuous and may be embodied as a burst transmission or an intermittent-type transmission between a base station and a mobile, for example. Accordingly, a base station in a third-generation system will attempt to manage a large pool of data users by assigning radio resources to each user for transmission. Typically this is done utilizing a prioritization scheme controlled by a scheduler in the base station controller.

Accordingly, the scheduler must be able to manage these large numbers of users without wasting radio resources of the communication system. This management function becomes even more important as a base station attempts to meet QoS (Quality of Service) requirements. QoS is a general term that may represent a number of different requirements. As a basic tenant, QoS is indicative of providing guaranteed performance (e.g., such as a minimum/maximum data throughput, a minimum delay requirement, a packet loss rate, and a packet download time, etc.) in a wireless communication system.

Quality of Service (QoS) differentiation in wireless data networks allows network operators to generate more revenue than is possible with best-effort scheduling policies. The promise of additional revenue is based on the willingness of end users (subscribers) to pay more for perceptible improvements in service (e.g., lower latency, higher throughput, or more predictable performance). In addition, revenue may also be increased by controlling churn via prioritization as the quality of experience over long periods of time is improved. QoS differentiation also enables deployment of new services (e.g., streaming audio/video, packet voice etc.) that cannot be provided with acceptable quality over best-effort scheduling policies or algorithms such as highest rate user first (HRUF)) scheduling, maximum carrier to interference ratio scheduling (Max C/I) and proportional fair (PF) scheduling, etc.

However, traffic generated by new application phones has raised exponentially while the vast majority of revenues in excess of prescribed postpaid plan tariffs, are reaped by the web platform service providers and their ad-networks. Worse, the revenue from real-time interactive communications such as voice has plummeted due to the commoditization of the voice service and changing demographics with newer generations preferring texting to voice communications.

SUMMARY OF THE INVENTION

One embodiment includes a method for scheduling transmissions to a plurality of mobile units in a communication network. The method includes assigning a priority to a mobile unit based on a Quality of Service (QoS) class associated with the mobile unit and a score associated with a user of the mobile unit.

Another embodiment includes a method of generating revenue in a wireless communication network having a mobile unit. The method includes determining a Quality of Service (QoS) class associated with the mobile unit. Determining an expected revenue for the mobile unit based on the QoS class. Determining a score associated with a user of the mobile unit, the score being based on an additional expected revenue for the mobile unit, the additional expected revenue being based on a communication associated with the mobile unit. Assigning the mobile unit to a revenue class based the expected revenue for the mobile unit and the additional expected revenue for the mobile unit. Generating the revenue by assigning a scheduling priority to the mobile unit based the revenue class.

Another embodiment includes a controller for scheduling transmissions to a plurality of mobile units in a communication network. The controller includes a scheduler configured to assign a priority to a mobile unit based on a Quality of Service (QoS) class associated with the mobile unit and a score associated with a user of the mobile unit.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

Figure 1:
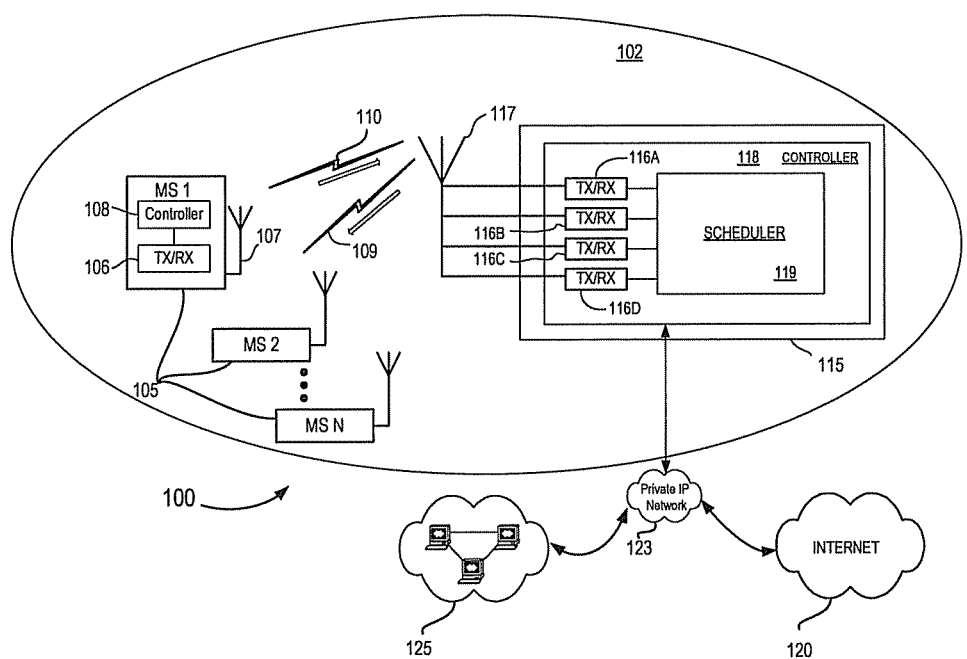
FIG. 1 illustrates a block diagram of a communication system in accordance with at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform in particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such info information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

As used herein, the term "mobile unit" may be considered synonymous to, and may hereafter be occasionally referred to, as a client, user equipment, mobile station, mobile user, mobile, subscriber, user, remote station, access terminal, receiver, etc., and may describe a remote user of wireless resources in a wireless communication network.

Similarly, as used herein, the term "base station" may be considered synonymous to, and may hereafter be occasionally referred to, as a Node B, evolved Node B, base transceiver station (BTS), etc., and may describe a transceiver in communication with and providing wireless resources to mobiles in a wireless communication network. As discussed herein, base stations may have all functionally associated with conventional, well-known base stations in addition to the capability to perform the methods discussed herein.

Initially, this disclosure will describe example embodiments the with regard to the mathematical equations used to support the example embodiments. After the mathematical equations are described, each of the figures will be described.

Revenue Management

Demand for resources may exceed a capacity limit C that is itself independent of price for the resources. A seller prices a unit sold based on a relationship between demand and price. This relationship may extract a corresponding revenue, $$r(t)=d(t,p) \times p(t) \qquad \text{Equation 1}$$

where,
t is time,
r is revenue,
d is demand, and
p is price.

The premise of revenue management (also known as yield management to those skilled in the art) may be to modulate demand by either capacity control or dynamic pricing. In capacity control, revenue management algorithms may produce nested booking limits that the various consumer segments may occupy. In the simplest example of two different price elasticity segments, revenue management may reserve some of the available capacity for a corresponding price elasticity segment (e.g., the consumers that are willing to pay more for improved quality of service). In dynamic pricing, revenue management may determine a schedule of prices that the various consumer segments may respond to depending on their own utility (e.g., a function of a willingness to pay for a service).

Nested Entitlement Protection Overview

The maximum average base station throughput of each base station with capacity limit C is rarely attainable as the capacity limit C depends on the distribution of applications being served and whether application flows deposit enough data in a transmission buffer associated with the base station. The capacity limit C may also not be attainable because the distribution of average signal to interference and noise ratio (SINR) across the mobile units associated with the base station and associated fairness constraints of the scheduler. The SINR distribution effectively introduces a network aspect in the available capacity. Therefore the carried cell capacity is c(t) and equivalently the base station has, at every time instant, a remaining capacity x(t)=C−c(t). The scope of revenue management may be to use the remaining capacity over a period of time in such a way that revenue of the network may be maximized. We can achieve that as follows:

Define nested entitlement buckets based on mobile unit scores. Score may be a scalar value to allow comparison between mobile units. The scalar value may be determined using a regression based on one or more predictors, for example, economic value. Mobile units are assigned to a bucket if their score (e.g. a regression of predictors such as economic value) in the network exceeds the corresponding protection limit.

All mobile units of a lower score may occupy the resources reserved by the higher score. However, when higher score mobile units are admitted the higher score mobile units may preempt lower score mobile units out of these resources or receive higher priority. For mobile units with Guaranteed Bit Rate (GBR) bearers, preemption may take the form of bearer reconfiguration towards a lower data rate or reconfiguration to a lower entitlement. For non-GBR bearers de-prioritization may be applied autonomously based on different entitlements or weights.

When the remaining capacity is large, higher score and lower score mobile units may compete on relatively equal grounds for the resources. As the base station available capacity decreases, the mobile unit score, a function of economic value, may have an increasing role as to how the remaining resources will be allocated.

Nested Entitlement Protection for Two Classes

When allocating a resource of capacity C, to two different classes of mobile units, each class may be represented by a price that mobile units in the respective class may pay for one unit of the resource. Let d and f denote the two classes, and let $$\frac{p_d}{p_f} \text{ and } \frac{D_d}{D_f}$$

respectively represent ratios of prices and demands for the two classes. Three assumptions may be made:

(1) $p_d < p_f$,
$D_d$ and $D_f$ are independent random variables, e.g., $$Pr\left(\frac{D_d}{D_f}\right) = Pr(D_d),$$

and (3) the class-d demand arrives before class-f demand.

The goal is to find an a-priori protection level y that represents the resource units that will be reserved for allocation to the class f traffic. The maximum number of resource units that may be allocated to class d may be, $$C_d = C - y \qquad \text{Equation 2}$$

where,
$C_d$ is the available capacity for class d,
C is the available capacity, and
y is the protection level.

The units that may be occupied by class d cannot exceed the corresponding demand for this class, e.g., $$S_d = \min(C_d, D_d) \qquad \text{Equation 3}$$

where,
$S_d$ is the number of units that may be occupied by class d,
$C_d$ is the available capacity for class d, and
$D_d$ is the demand for class d.

Therefore the maximum number of resource units that may be allocated to class f may be, $$C_f = C - \min(C_d, D_d) = \max(y, C - D_d) \qquad \text{Equation 4}$$

where,
$C_f$ is the available capacity for class f,
$C_d$ is the available capacity for class d,
$D_d$ is the demand for class d,
C is the available capacity, and
y is the protection level.

The units that will be occupied by class f is then, $$S_f = \min(C_f, D_f) \qquad \text{Equation 5}$$

where,
$S_f$ is the number of units that may be occupied by class f,
$C_f$ is the available capacity for class f, and $D_f$ is the demand for class f.

An expected revenue from the occupied resources may be $E\{p_d S_d + p_f S_f\}$, where the expectation is taken over the random demands of the two classes. Maximizing revenue (e.g., maximizing an optimization problem) over the protection level y, may result in, $$V_d(C) = \max_{0 \leq y \leq C} E\{p_d S_d + p_f S_f\} \quad \text{Equation 6}$$
$$= \max_{0 \leq y \leq C} E\{p_d \min(C - y, D_d) + p_f \min(\max(y, C - D_d), D_f)\}$$

where,
E is the expectation operator,
$C_f$ is the available capacity for class f,
$C_d$ is the available capacity for class d,
$D_f$ is the demand for class f,
$D_d$ is the demand for class d,
$p_f$ is the price for class f,
$p_d$ is the price for class d,
C is the available capacity, and
y is the protection level.

Intuitively, the ratio of the prices $$r = \frac{p_d}{p_f}$$

may help to determine some trends in setting the reservation level y. For example, if the ratio is very small (e.g., $p_f \gg p_d$), then a scheduler may reserve most of the overall capacity C for class f (e.g., $C_f \gg C_d$). If, on the other hand, the ratio is close to 1, then the scheduler may reserve a relatively small capacity for class f (e.g., $C_f \ll C_d$), because revenue would be relatively the same with class d.

Assuming a fixed price ratio r that is not close to the two extremes above, the remaining factors that may determine y for optimal revenue may be determined. From equations 2-6 above that factor seems to be the shape of the tail of the demand function for class f, e.g., $Pr(D_f > y)$. This is because the revenue for the reserved capacity may only be determined if the associated demand is $D_f > y$ Dynamic Programming To use a dynamic programming problem formulation, the variables at the beginning of two periods involved may be defined. The first period may be the time just before the class d demand is observed (e.g., when the available capacity is C). The associated variable is called the value function $V_d(C)$ and represents the a-priori optimal expected revenue starting with C units of capacity. An upper bound of this value function may be $V_d(C) \leq p_f C$, the upper bound may be obtained when the available capacity for class f is protected.

Similarly, the second variable is the value function $V_f(x)$ that represents the a-priori optimal expected revenue starting with x units of capacity just before observing $D_f$ or equivalently after we observe $D_d$.

$$V_f(x) = E\{p_f \min(x, D_f)\} = p_f \sum_{j=1}^{x} Pr(D_f \geq j) \quad \text{Equation 7}$$

where,
$V_f(x)$ is the value function,

E is the expectation operator,
$D_f$ is the demand for class f,
$p_f$ is the price for class f, and
x is the starting number of units of capacity.

The dynamic program formulation may involve relating $V_d(C)$ to $V_f(x)$. If we rewrite $V_d(C)$ from the discussion above, $$V_d(C) = \max_{0 \leq y \leq C} E\{p_d \min(C - y, D_d)\} + E\{V_f(C_f)\} \quad \text{Equation 8}$$
$$= \max_{0 \leq y \leq C} E\{p_d \min(C - y, D_d)\} + E\{V_f(\max(y, C - D_d))\}$$
$$= \max_{0 \leq y \leq C} \{W(y, C)\}$$

where, $$W(y,C) = E\{p_d \min(C-y, D_d)\} + E\{V_f(\max(y, C-D_d))\}$$

E is the expectation operator,
$C_f$ is the available capacity for class f,
$D_d$ is the demand for class d,
$p_d$ is the price for class d,
C is the available capacity, and
y is the protection level.

The revenue difference from one unit of protection level is given by, $$\Delta W(y, C) = W(y, C) - W(y-1, C) \quad \text{Equation 9}$$
$$= \lfloor p_f Pr(D_f \geq y) - p_d \rfloor Pr(D_d \geq C - y)$$

where, $$W(y,C) = E\{p_d \min(C-y, D_d)\} + E\{V_f(\max(y, C-D_d))\}$$

$D_d$ is the demand for class d,
$D_f$ is the demand for class f,
$p_d$ is the price for class d,
$p_f$ is the price for class f,
C is the available capacity, and
y is the protection level.

The term $\Delta V_f(y) - p_d$ will start positive and then become negative. In other words the marginal value will have at least a local maximum. This may be shown by replacing y with $\infty$ which causes the term $p_f Pr(D_f \geq y) - p_d$ to be $-p_d$ and in the other extreme, if we replace y with 0 the term $p_f Pr(D_f \geq y) - p_d$ will be $p_f - p_d$. Further, that the marginal value $V_f(x)$ itself reduces with remaining capacity x. The marginal value depends on how much the tail of the class-d demand exceeds the available capacity.

Calculating the Optimal Protection Limit and Maximum Revenue

The optimal protection level y (denoted as y*) may be found as, $$y^* = \max\{y \in N : p_f Pr(D_f \geq y^*) \geq p_d\} \quad \text{Equation 10}$$
$$= \max\left\{y \in N : Pr(D_f \geq y^*) \geq \frac{p_d}{p_f}\right\}$$

where,
N is the set of positive integer numbers,
$D_f$ is the demand for class f,
$p_d$ is the price for class d, $p_f$ is the price for class f,
y is the protection level, and
y* is the optimal protection level.
The optimal booking limit will then be, $$b^* = (C - y^*)^+ \quad \text{Equation 11}$$

where,
b* is the optimal booking limit, and
C is the available capacity, and
y* is the optimal protection level.
The maximum possible revenue starting with capacity C is given by, $$V_d(C) = \begin{cases} W(y^*, C) & \text{if } y^* \le C, \\ W(C, C) & \text{if } y^* > C. \end{cases} \quad \text{Equation 12}$$

where, $$W(y,C) = E\{p_d \min(C-y, D_d)\} + E\{V_f(\max(y, C-D_d))\}$$

C is the available capacity, and
y* is the optimal protection level.
Calculating W(y*,C) may be done iteratively, knowing, $$W(y,C) = W(y-1,C) + E\{p_f Pr(D_f \ge y) - p_d\} Pr(D_d > C-y) \quad \text{Equation 13}$$

where, $$W(y,C) = E\{p_d \min(C-y, D_d)\} E\{V_f(\max(y, C-D_d))\}$$

$D_d$ is the demand for class d,
$D_f$ is the demand for class f,
$p_d$ is the price for class d,
$p_f$ is the price for class f,
C is the available capacity, and
y is the protection level.
To start the iteration W(0,C) may be written as, $$W(y,0) p_d E\{\min(C, D_d)\} + E\{V_f(\max(0, C-D_d))\} \quad \text{Equation 14}$$

where,
$D_d$ is the demand for class d,
$p_d$ is the price for class d, and
C is the available capacity.
The first expectation may be written using partial expectations as, $$E\{\min(C, D_d)\} = \sum_{j=1}^{C} Pr(D_d \ge j) \quad \text{Equation 15}$$

where,
E is the expectation operator, $D_d$ is the demand for class d, and
C is the available capacity.
The second expectation may be written as, $$E\{V_f(\max(0, C - D_d))\} = \sum_{j=0}^{C} V_f(C-j) Pr(D_d = j) \quad \text{Equation 16}$$

where,
E is the expectation operator,
$D_d$ is the demand for class d, and
C is the available capacity.
From equations 15 and 16 W(0,C) may be used to calculate W(1,C) and iterate until all W(y*,C) are calculated.

Two Class Example

A class example will be described while referring to two classes with Poisson arrivals as shown in Table 1 and with regard to an available initial capacity C=100.

TABLE 1

| Class | Economic Value | Demand Distribution | Optimal Protection Level |
|---|---|---|---|
| 1 | 1000 | Poisson(40) | 41 |
| 2 | 450 | Poisson(15) | 100 |

From table 1, class 1 has the higher economic value. Therefore, from equation 10, class 1 has the lower optimal protection level y*. The protection limits calculated result in the following booking limits: $b2=C-y_1^*=59$ and $b1=C-y_2^*=0$. In other words, class 1 may be entitled to 100% of the available capacity while class 2 may be entitled to 59% of the available capacity.

Further, the marginal value of capacity may decrease as the remaining capacity increases. For example, the more capacity remaining, the less a unit of this capacity should be worth.

DESCRIPTION OF THE FIGURES

FIG. 1 is a block diagram of a communication system in accordance with at least one example embodiment. System 100, may be illustrated by a cell 102 containing one or more mobile units 105 in communication with, or served by a base station 115. Mobile unit 105 may communicate through base station 115 to exchange packet data with the Internet 120 or some other packet data network 125, such as a closed corporate network (e.g., intranet) for example. Examples of packet data may include Internet Protocol (IP) datagrams used for applications such as accessing web pages and retrieving email. Such packet data applications may run on mobile unit 105, or may run on a separate computer device that uses mobile unit 105 as a wireless modem. In at least one example embodiment, mobile unit 105 may communicate with wireless network 115 over an air interface, which may be a set of forward and reverse channels for example. This may be shown as forward link 109 and reverse link 110.

Base station 115 may consist of a single base station and base station controller, or may include a plurality of separately located wireless base stations (e.g., access network and a base station controller connected together as an aggregate base station 115). Each base station may have a number of traffic channels to use for exchanging data with mobile units 105. When one of the traffic channels is assigned to a mobile unit 105, that mobile unit 105 may be referred to as an active mobile unit 105. At least one traffic channel is assigned to each active mobile unit 105.

Base station 115 may be connected with packet data network 120 using back-haul facilities such as T1/E1, STM-x, etc, or any other appropriate type of network connection, such as wireless or wire-line T1 or T3, fiber optic connection, Ethernet, etc. Base station 115 may be connected to multiple packet data networks having more than one type. For example, instead of an intranet, another network 125 may be a public switched telephone network (PSTN) connected with base station 115 through a data services inter-working function (IWF). Base station 115 may be interconnected with the internet 120 and/or the another network 125 via a Private IP Network 123.

In FIG. 1, base station 115 may include a plurality of transceivers 116A-D, an antenna 117 connected to each transceiver, and a base station controller 118 connected with and controlling each of the transceivers 116A-116D. The controller 118 may include an airlink scheduler 119 or may implement a scheduling function or algorithm, for example. The mobile units 105 may be identical or substantially similar to one another. It suffices, therefore, to describe a single mobile unit 105 which may include a transceiver 106, an antenna 107 connected thereto, and a controller 108 also connected to the transceiver 106. Not shown in FIG. 1 for clarity, it being understood that a PDSN is an interface between base station controller 118, via the Private IP Network 123 and the Internet or another Packet Data Network (PDN).

Although controller 108 is shown as part of base station 115, base station controller 118 functions could be implemented by an external server which communicates with the base station 115 via a private IP network (not shown for clarity) like private IP network 123.

Each of the plurality of mobile units 105 communicates with the base station 115 and transmits thereto, in reverse link 110, a requested service rate (e.g., data rate request) DRC(n, i), n representing the n-th time slot for a transmission of data and i indicating the mobile unit transmitting the requested service rate. The base station 115 allocates a next transmission of data in the n-th time slot. The allocation may be made according to a scheduling operation performed by scheduler 119 that may prioritize the plurality of mobile units 105, so as to provide enhanced throughput control when implemented by the base station controller 118.

Air Interface

On the forward link 107, Time Division Multiplexing (TDM) may be employed to transmit data from the base station 115 to mobile units 105. Downlink transmissions occur at fixed time intervals, or timeslots (hereinafter referred to as "slots"), each slot having a fixed duration of, for example, 1.667 ms. A preamble within each slot may indicate the mobile unit 105 to whom this slot is allocated. Every mobile unit 105 that can decode the pilot of the base station 115 performs an estimate of the channel between the base station that transmitted the pilot and itself. The sectors of the base station 115 to which the mobile unit 105 has the best channel are included in the active set of the mobile unit 105.

Scheduler 119 determines which mobile unit 105 to transmit to in each slot. Because the scheduler 119 may reside at the base station 115, the scheduler 119 may have the ability to quickly react and exploit the temporary peaks in different users' (mobile units 105) channel conditions (channel condition is implicitly reported by the mobile unit 105, as explained in further detail below), potentially optimizing the overall performance and capacity of the system 100.

The following description of FIG. 1 includes references to a 1×-EV-DO system. Example embodiments are not limited thereto. For example, the radio interface may be any one of the third generation or fourth generation radio interfaces described above. However, example embodiments are not limited to third generation or fourth generation radio interfaces.

In FIG. 1, mobile unit 105 may be functionally divided into a computing device such as a PC, which is responsible for point-to-point protocol (PPP) and higher layer protocol functionality (IP, TCP, RTP, HTTP, etc.) and an access terminal (AT). The AT is responsible for the airlink and radio link protocol (RLP) layers. When a mobile unit 105 (mobile user) dials into the 1×-EV-DO system, the PDSN authenticates the user request by querying, for example, an AAA server (not shown) and subsequently establishes a PPP connection with the mobile unit 105. This PPP connection is the medium for all data transfers to and from the mobile unit 105. Since 1×-EV-DO airlink is subject to errors (the system operates at 1% packet error rate, on average), a Radio Link Protocol (RLP) is employed for performing ARQ to recover lost or corrupted data. The residual error rate after the RLP recovery procedure is quite small and hence does not significantly impact TCP throughput. RLP functionality is implemented in the base station controller 118.

Airlink Scheduling

Depending on the coding rate selected and the quality of the channel, transmission of a single frame, such as a Radio Link Protocol (RLP) frame from the base station 115, may span multiple airlink slots. In, for example, 1×-EV-DO, IP packets belonging to a mobile unit 105 are segmented into fixed, 128-byte RLP frames at the base station controller 118, which may or may not be part of the base station 115. Functions of the base station controller may be implemented by an external server communicating with a base station via a private IP network 123, for example, and then transported to the base station 115. Depending on the DRC feedback received in the DRC channel from the mobile unit 105, the base station 115 decides how many RLP frames can be sent in a slot and the corresponding modulation and coding scheme. If the mobile unit receives an RLP frame in error, it sends a NACK (Negative Acknowledgment) and the RLP frame is re-transmitted. Only one retransmission is allowed per RLP frame. Once the mobile unit receives all the RLP frames belonging to a PPP frame, the PPP frame is re-assembled and handed over to the PPP layer for further processing.

Hence, some slots are "reserved" for RLP frames that are in the process of being transmitted to a mobile unit 105. Unreserved slots, however, can be allocated to any mobile unit 105. If a slot is unreserved, a scheduling function in accordance with an exemplary embodiment of the present invention may be invoked by scheduler 119 to determine which of the mobile units 105 with pending downlink data and suitable link performance should be allocated the slot. A DRC value of 0 is used by mobile units 105 to inform the base station 115 that the downlink channel has an unacceptably high error rate. If the slot is reserved, implying that there was a mobile unit 105 that sent a NACK for a transmission before, then the base station 115 transmits some more coded bits to the mobile unit 105 in the current slot.

As will be seen in further detail below, the scheduler and scheduling method in accordance with example embodiments may employ QoS class-specific minimum and maximum rates. QoS class may be defined as classes of users that are arranged based on how much each user or subscriber pays for specified services and data rates, for example. Alternatively, QoS class could be based on the nature of traffic a user may be carrying, for example, real time, non-real-time, etc. At each unreserved slot, the scheduler 119 selects a user (mobile unit 105) in such a way that these minimum and maximum rates are enforced over a suitable time horizon.

QoS Class-specific rates

Central to the scheduler 119 is the notion of QoS class-specific minimum ($R_i^{min}$) and maximum ($R_i^{max}$) rates. As discussed above, at each unreserved slot the scheduler 119 chooses the mobile unit 105 in such a way that these minimum and maximum rates are enforced over a suitable time horizon. Because the airlink is typically the most limited resource in the system 100, it is apparent that enforcing minimum rate requirement must be done on the airlink. Maximum rate on the other hand can be enforced either on the airlink or in the back-haul network.

For example, the PDSN can maintain a measure of the traffic flowing into the radio access network (containing base station 115) from the Internet and appropriately drop packets that exceed their subscribed $R_i^{max}$. On the other hand, $R_i^{max}$ can be made an integral part of the ranking computation perform Died at the scheduler 119. Accordingly, $R_i^{max}$ is enforced at the PDSN and the base station 115 performs the task of maximizing system throughput while enforcing minimum rates.

Figure 2:
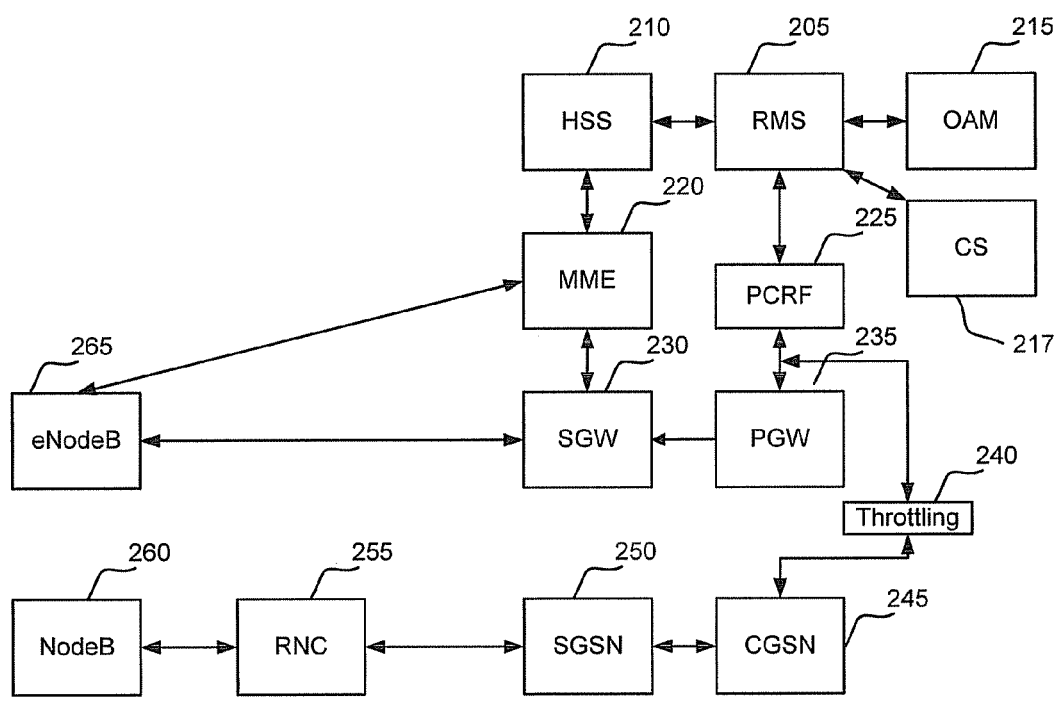
FIG. 2 illustrates a block diagram of a communication system in accordance with at least one example embodiment.

FIG. 2 illustrates a block diagram of a communication system in accordance with at least one example embodiment. As shown in FIG. 1 the communication system includes a revenue management system (RMS) 205, a home subscriber server (HSS) 210, an operations and administration manager (OAM) 215, a charging server (CS) 217, a mobility management entity (MME) 220, a policy and charging rules function (PCRF) 225, a signaling gateway (SGW) 230, a packet data network gateway (PGW) 235, a throttling module 240, a combined GPRS service node (CGSN) 245, a serving GPRS support node (SGSN) 250, a radio network controller (RNC) 255, a NodeB 260 and an eNodeB 265.

The RMS 205 may include one or more components (e.g. modules or functional components). For example, the RMS 205 may include a module to store the parameters and input data associated with one or more of the equations (e.g., equations 1-16) described above. The module to store the parameters and input data associated with one or more of the equations may be, for example, a memory or a database.

For example, the RMS 205 may include another module to determine the optimal protection level (e.g., y* described above with regard to equation 10). For example, the RMS 205 may include yet another module to determine entitlement weights (e.g., a score) associated with a user of a mobile unit. The yet another module to determine entitlement weights may map optimal protection levels to entitlement weights.

For example, a mapping function α=h(y*) may be optimized by an operator of a network. In at least one example embodiment the mapping function may convert protection levels to a simple fraction of the capacity C that may be assigned to a corresponding class. This fraction or weight (α) may be used by the scheduler 119 that also uses a ratio of an instantaneously achievable rate and an average rate (e.g., data rate) to determine the rank of each user that is to be scheduled.

For example, the RMS 205 may include still another module to receive information relative to variables associated with equations 1-16 described above. For example, the RMS 205 may receive demand information associated with a mobile unit from the HSS 210. For example, the RMS 205 may receive price information associated with a user of a mobile unit from the OAM 215 or the charging server 217.

For example, the RMS 205 may include another module to transmit the determined entitlement weights (e.g., scores) associated with users of mobile units of mobile units to a scheduler associated with NodeB 260 and/or eNodeB 265. For example, if controller 118 is associated with eNodeB 265, then the RMS 205 may transmit the determined entitlement weights to scheduler 119 via a second mapping function QCI=g(α). The QoS Class Identifier (QCI) is propagated via well known in the art interfaces from the PCRF/OAM/PGW to the eNB. The eNB may apply an inverse mapping function (via a Look Up Table) to obtain the priority or entitlement weight alpha.

As one skilled in the art will appreciate, scheduling may be performed by any one of a plurality of components in a wireless network. For example, scheduling may be performed by throttling 240, PGW 235, RNC 255, NodeB 206 and/or eNodeB 265.

The elements of the communication system illustrated in FIG. 2 that are not described in detail above and below are known to those skilled in the art. The non-limiting elements are illustrated in order to give those skilled in the art an exemplary context to describe example embodiments and will not be described in further detail for the sake of brevity.

Figure 3:
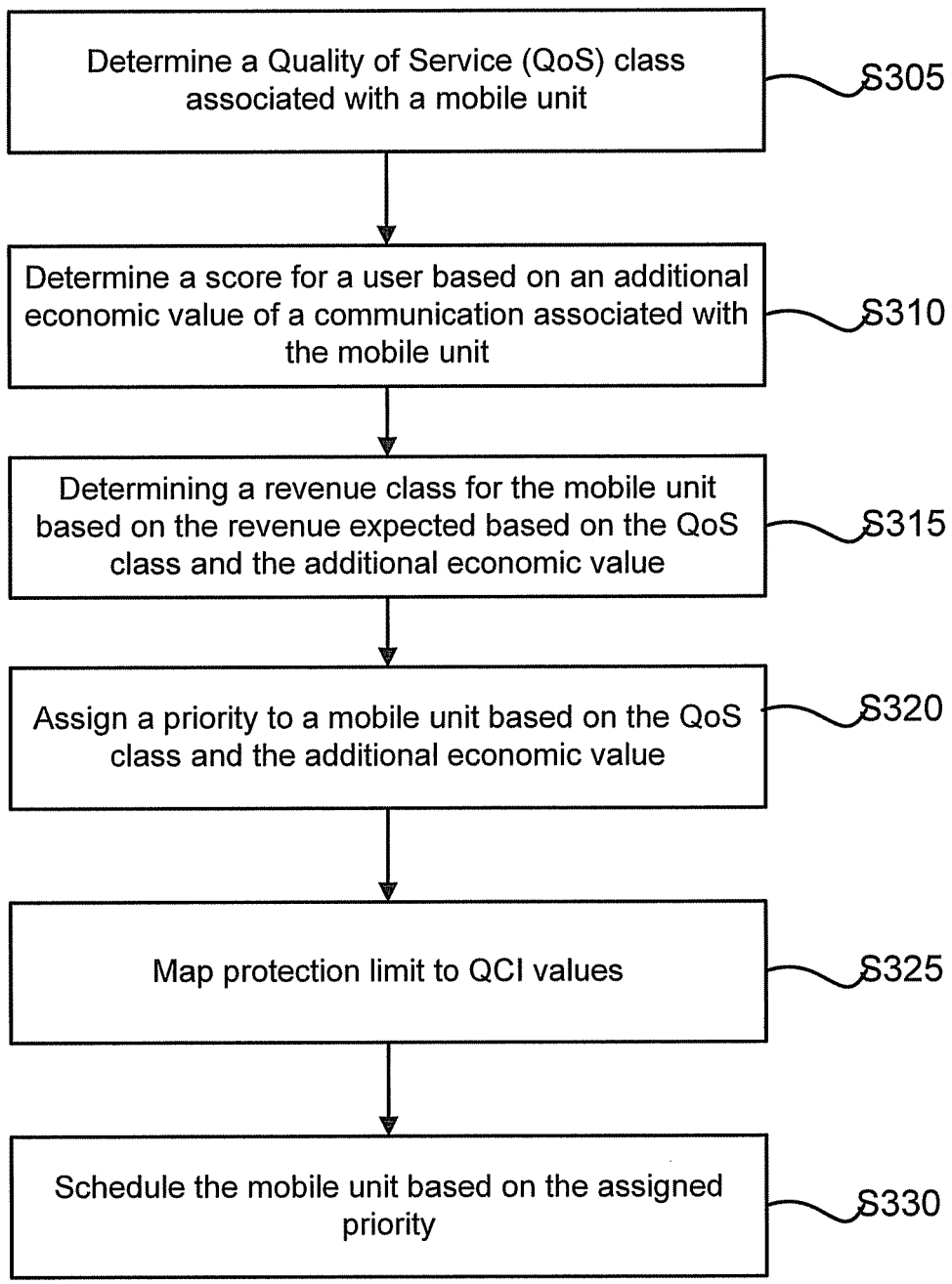
FIG. 3 illustrates a method of scheduling a mobile unit in accordance with at least one example embodiment.

FIG. 3 illustrates a method of scheduling a mobile unit in accordance with at least one example embodiment. Each of the steps of FIG. 3 may be performed in association with revenue generation as discussed above. Each of the steps of FIG. 3 may be performed in association with the equations discussed above.

Referring to FIG. 3, in step S305 a subscription control entity (e.g., HSS 210), determines a Quality of Service (QoS) class associated with a mobile unit. For example, as discussed above, a QoS class-specific minimum ($R_i^{min}$) and maximum ($R_i^{max}$) rates may be assigned to the mobile unit. As discussed above, QoS differentiation in wireless data networks allows network operators to generate more revenue than is possible with best-effort scheduling policies. The promise of additional revenue is based on the willingness of end users (subscribers) to pay more for perceptible improvements in service (e.g., lower latency, higher throughput, or more predictable performance). A QoS class may be based the aforementioned QoS differentiation.

In step S310 the RMS 205 determines a score for a user of a mobile unit (e.g., mobile unit 105). For example, the score may be based on an additional economic value of a communication associated with the mobile unit. The additional economic value may be based on an expected revenue associated with the communication, the expected revenue being in addition to revenue expected based on the QoS class.

For example, in step S310, the RMS 205 may use equations 10-16 described above to determine a score of the mobile unit 105. The scheduler may determine an optimal protection limit and maximum revenue for the mobile unit 105. For example, the RMS 215 may use at least an available capacity and a price paid by the mobile unit 105 to determine the optimal protection limit, the maximum revenue and the score for the mobile unit 105.

The communication may be content including an advertisement. The expected revenue may be associated with the content in the communication. The expected revenue may be based on data packets transmitted in excess of a data packet allocation based on the QoS class.

In step S315 the RMS 205 determines a revenue class for the mobile unit based on the score, the revenue expected based on the QoS class and/or the additional economic value. A revenue class may be, for example, class d and class f as described above with regard to the two class example. For example, the RMS 205 may determine a plurality of revenue classes based on a plurality of protection levels as described above. The revenue classes may be based on the nested protection levels as discussed above.

For example, as described above with regard to equations 10 and/or 16 (but not limited thereto) an optimal protection level may be determined for the mobile unit 105 by the RMS 205. There may be a plurality of ranges (buckets) of optimal protection levels as associated with a revenue class.

In step S320 the RMS 205 assign a priority to the mobile unit based on the QoS class and the additional economic value. For example, each of the revenue classes may have an associated priority. In step S315 the RMS 205 determined a revenue class for the mobile unit. Therefore, each of the mobile units associated with the determined revenue class share a same priority.

The RMS 205 may assign the priority to the mobile unit to maximize expected revenue associated with mobile units in the determined revenue class and with mobile units in the other revenue classes. For example, the RMS 205 may assign relatively higher priorities to mobile units and/or revenue classes with relatively high expected revenues. For example, continuing the example above, the mobile unit 105 may be assigned to the revenue class if the determined protection level associated with the mobile unit 105 is within a range associated with a revenue class.

In step S325 the RMS 205 maps the protection levels to QCI values. For example, the RMS 205 may use a first mapping function $\alpha=h(y^*)$, as described above, and a second mapping function $QCI=g(\alpha)$, as described above, to map the protection levels to QCI values.

In step S330 the scheduler schedules the mobile unit based on the assigned priority. For example, as discussed above, at each unreserved slot the scheduler 119 chooses the mobile unit 105 taking into account the assigned priority associated with mobile unit 105 over a suitable time horizon.

The RMS 205 may determine if the communication network includes an excess capacity, and the scheduler may assign the excess capacity to the mobile unit based on maximizing an expected revenue associated with the communications network. For example, maximizing the expected revenue associated with the communications network may be based on an aggregate demand associated with the determined revenue class and an aggregate demand associated with other revenue classes. For example, the RMS 205 may solve equations 15 and 16 (but not limited thereto) to schedule based on excess capacity.

For example, maximizing the expected revenue associated with the communications network may be based on the protection levels as discussed above. The protection levels may be based on a quantity of the excess capacity being reserved to mobile units associated with a revenue class having a relatively high priority value. The mobile units associated with the revenue class associated with a relatively high priority value may preempt mobile units associated with a revenue class having a relatively low priority value from the use of the excess capacity.

For example, maximizing the expected revenue may be based on a solution to the optimization problem (equation 6) as described above. Further, determining the protection levels (e.g., for determining revenue classes) may be based on the optimization problem, where each of the protection levels is expressed as a fraction of a total capacity of the communication network.

Returning to step S330 of FIG. 3, the RMS 205 may include assigning entitlements or priorities to mobile units associated with a first revenue class based on a capacity protection level. The capacity protection level may be determined using the optimization problem (e.g., equation 6 described above). Mobile units associated with the first revenue class may have a lower priority than mobile units associated a second revenue class, and the revenue protection level may be based on a quantity of an excess capacity being reserved to mobile units associated with the second revenue class.

Although the above example embodiment describes the steps as being performed by the RMS 205, example embodiments are not limited thereto. For example, the above steps may be preformed by any network component (e.g., scheduler 119, eNodeB 265, NodeB 260, RNC 255 or the like).

Alternative embodiments of the invention may be implemented as a computer program product for use with a computer system, the computer program product being, for example, a series of computer instructions, code segments or program segments stored on a tangible or non-transitory data recording medium (computer readable medium), such as a diskette, CD-ROM, ROM, or fixed disk, or embodied in a computer data signal, the signal being transmitted over a tangible medium or a wireless medium, for example, microwave or infrared. The series of computer instructions, code segments or program segments can constitute all or part of the functionality of the methods of example embodiments described above, and may also be stored in any memory device, volatile or non-volatile, such as semiconductor, magnetic, optical or other memory device.

While example embodiments have been particularly shown and described, it will be understood by one of ordinary skill in the art that variations in fowl and detail may be made therein without departing from the spirit and scope of the claims.

The invention being thus described, it will be obvious that the same may be varied in many ways. Such variations are not to be regarded as a departure from the invention, and all such modifications are intended to be included within the scope of the invention.

I claim:

1. A method for scheduling transmissions to a plurality of mobile units in a communication network, comprising:
   assigning a priority to a mobile unit based on a Quality of Service (QoS) class associated with the mobile unit and assigning a score to the mobile unit, the score being associated with a user of the mobile unit,
   the priority being assigned to the mobile unit based on an expected revenue associated with the QoS class,
   the score being assigned to the mobile unit based on an expected revenue associated with a communication of the mobile unit, and
   an additional economic value is based on the expected revenue associated with the communication, the expected revenue associated with the communication being in addition to the expected revenue associated with the QoS class.

2. The method of claim 1, comprising:
   determining a revenue class for the mobile unit based on the revenue expected based on the QoS class and the additional economic value; and
   the assigning assigns the priority to the mobile unit based on expected revenue associated with mobile units in the determined revenue class.

3. The method of claim 2, wherein the assigning assigns the priority to the mobile unit based on expected revenue associated with mobile units in the determined revenue class and other revenue classes.

4. The method of claim 3, wherein the assigning assigns the priority to the mobile unit to maximize expected revenue associated with mobile units in the determined revenue class and with mobile units in the other revenue classes.

5. The method of claim 3, wherein
   the communication network includes an excess capacity, and
   the assigning assigns the excess capacity to the mobile unit based on maximizing an expected revenue associated with the communications network.

6. The method of claim 5, wherein maximizing the expected revenue associated with the communications network is based on an aggregate demand associated with the determined revenue class and an aggregate demand associated with the other revenue classes.

7. The method of claim 6, wherein
   maximizing the expected revenue associated with the communications network is based on a protection level, the protection level is based on a quantity of the excess capacity being reserved to mobile units associated with a revenue class having a relatively high priority value, and the mobile units associated with the revenue class associated with a relatively high priority value preempt mobile units associated with a revenue class having a relatively low priority value from the use of the quantity of the excess capacity.

8. The method of claim 7, wherein the expected revenue associated with the communication network is maximized using an optimization problem, $$\max_{0 \leq y \leq C} E\{p_d \min(C - y, D_d) + p_f \min(\max(y, C - D_d), D_f)\},$$

where
d is a first revenue class,
f is a second revenue class,
C is the excess capacity,
E is an expectation operator,
$p_d$ is an economic value for mobile units associated with revenue class d,
$p_f$ is an economic value for mobile units associated with revenue class f,
y is the protection level,
$D_d$ is a demand associated with mobile units associated with revenue class d, and
$D_f$ is a demand associated with mobile units associated with revenue class f, assuming the economic value for mobile units associated with revenue class d is greater than the economic value for mobile units associated with revenue class f.

9. The method of claim 8, further comprising:
determining a plurality of protection levels based on the optimization problem, each of the plurality of protection levels is expressed as a fraction of a total capacity of the communication network,
the protection levels are mapped to a QoS Class Identifier value, and
the assigning a priority to a mobile unit based on the QoS Class Identifier value.

10. The method of claim 8, further comprising:
scheduling mobile units associated with a first revenue class from a transmission scheduling queue with a scheduling rate based on a capacity protection level, the capacity protection level being determined by the optimization problem, wherein
mobile units associated with the first revenue class have a lower priority than mobile units associated a second revenue class, and
the revenue protection level is based on a quantity of an excess capacity being reserved to mobile units associated with the second revenue class.

11. The method of claim 1, wherein the communication is content including an advertisement.

12. The method of claim 1, wherein the expected revenue is associated with content in the communication.

13. The method of claim 1, wherein the expected revenue is based on data packets transmitted in excess of a data packet allocation based on the QoS class.

14. A method of generating revenue in a wireless communication network having a mobile unit, the method comprising:

determining a Quality of Service (QoS) class associated the mobile unit;
determining an expected revenue for the mobile unit based on the QoS class.
determining a score associated with a user of the mobile unit, the score being based on an additional expected revenue for the mobile unit, the additional expected revenue being based on a communication associated with the mobile unit,
assigning the mobile unit to a revenue class based the expected revenue for the mobile unit and the additional expected revenue for the mobile unit,
generating the revenue by assigning a scheduling priority to the mobile unit based the revenue class.

15. The method of claim 14, wherein
the communication network includes an excess capacity, and
the assigning assigns the excess capacity to the mobile unit based on maximizing an expected revenue associated with the communications network.

16. The method of claim 15, comprising:
determining a revenue class for the mobile unit based on the revenue expected based on the QoS class and the additional economic value; and
the assigning assigns the priority to the mobile unit based on expected revenue associated with mobile units in the determined revenue class and maximizing an expected revenue associated with the excess capacity.

17. The method of claim 16, wherein maximizing the expected revenue associated with the excess capacity is based on demand associated with the mobile units associated with the determined revenue class and a demand associated with mobile units being scheduled for transmission associated with other revenue classes.

18. The method of claim 15, wherein
maximizing the expected revenue associated with the communications network is based on a protection level,
the protection level is based on a quantity of the excess capacity being reserved to mobile units associated with a revenue class having a relatively high priority value, and
the mobile units associated with the revenue class associated with a relatively high priority value preempt mobile units associated with a revenue class having a relatively low priority value from the use of the quantity of the excess capacity.

19. The method of claim 18, wherein the expected revenue associated with the communication network is maximized an optimization problem, $$\max_{0 \leq y \leq C} E\{p_d \min(C - y, D_d) + p_f \min(\max(y, C - D_d), D_f)\},$$

where
d is a first revenue class,
f is a second revenue class,
C is the excess capacity,
E is an expectation operator,
$p_d$ is an economic value for mobile units associated with revenue class d,
$p_f$ is an economic value for mobile units associated with revenue class f,
y is the protection level,
$D_d$ is a demand associated with mobile units associated with revenue class d, and $D_f$ is a demand associated with mobile units associated with revenue class f, assuming the economic value for mobile units associated with revenue class d is greater than the economic value for mobile units associated with revenue class f.

20. The method of claim 19, further comprising:
removing mobile units associated with a first QoS class from a transmission scheduling queue with a removal rate based on a revenue protection level, the revenue protection level being a minimum expected revenue associated with the communication network, wherein
mobile units associated with the first QoS class have a lower priority than mobile units associated a second QoS class, and
the revenue protection level is based on a quantity of an excess capacity being reserved to mobile units associated with the second QoS class.

21. The method of claim 19, further comprising:
scheduling mobile units associated with a first revenue class from a transmission scheduling queue with a scheduling rate based on a capacity protection level, the capacity protection level being determined by the optimization problem, wherein
mobile units associated with the first revenue class have a lower priority than mobile units associated a second revenue class, and
the revenue protection level is based on a quantity of an excess capacity being reserved to mobile units associated with the second revenue class.

22. A controller including a processor for scheduling transmissions to a plurality of mobile units in a communication network, comprising:
a scheduler, when executed by the processor, configured to assign a priority to a mobile unit based on a Quality of Service (QoS) class associated with the mobile unit and configured to assign a score associated with a user of the mobile unit,
the priority is assigned to the mobile unit based on an expected revenue associated with the QoS class,
the score is assigned to the mobile unit based on an expected revenue associated with a communication of the mobile unit, and
an additional economic value is based on the expected revenue associated with the communication, the expected revenue associated with the communication being in addition to the expected revenue associated with the QoS class.

23. The controller of claim 22, wherein the scheduler is further configured to,
remove mobile units associated with a first QoS class from a transmission scheduling queue with a removal rate based on a revenue protection level, the revenue protection level being a minimum expected revenue associated with the communication network, wherein
mobile units associated with the first QoS class have a lower priority than mobile units associated a second QoS class, and
the revenue protection level is based on a quantity of an excess capacity being reserved to mobile units associated with the second QoS class.

24. The controller of claim 23, further comprising:
scheduling mobile units associated with a first revenue class from a transmission scheduling queue with a scheduling rate based on a capacity protection level, the capacity protection level being determined by the optimization problem, wherein
mobile units associated with the first revenue class have a lower priority than mobile units associated a second revenue class, and
the revenue protection level is based on a quantity of an excess capacity being reserved to mobile units associated with the second revenue class.

25. The controller of claim 22, wherein the communication is content including an advertisement.

26. The controller of claim 22, wherein the expected revenue is associated with content in the communication.

27. The controller of claim 22, wherein the expected revenue is based on data packets transmitted in excess of a data packet allocation based on the QoS class.

28. The controller of claim 22, wherein the scheduler is further configured to,
determine a revenue class for the mobile unit based on a sum of the revenue expected based on the QoS class and the additional economic value, and
the scheduler assigns the priority to the mobile unit based on expected revenue associated with mobile units in the determined revenue class.

29. The controller of claim 28, wherein the scheduler assigns the priority to the mobile unit based on expected revenue associated with mobile units in the determined revenue class and other revenue classes.

30. The controller of claim 29, wherein maximizing the expected revenue associated with the communications network is based on an aggregate demand associated with the determined revenue class and an aggregate demand associated with the other revenue classes.

31. The controller of claim 29, wherein
the communication network includes an excess capacity, and
the scheduler assigns the excess capacity to the mobile unit based on maximizing an expected revenue associated with the communications network.

32. The controller of claim 31, wherein maximizing the expected revenue associated with the communications network is based on demand associated with the mobile unit and a demand associated with other mobile units, the other mobile units being associated with the other revenue classes.

33. The controller of claim 32, wherein
maximizing the expected revenue associated with the communications network is based on a protection level,
the protection level is based on a quantity of the excess capacity being reserved to mobile units associated with a revenue class having a relatively high priority value, and
the mobile units associated with the revenue class associated with a relatively high priority value preempt mobile units associated with a revenue class having a relatively low priority value from the use of the quantity of the excess capacity.

34. The controller of claim 33, wherein the expected revenue associated with the communication network is maximized using an optimization problem, $$\max_{0 \leq y \leq C} E\{p_d \min(C - y, D_d) + p_f \min(\max(y, C - D_d), D_f)\},$$

where
d is a first revenue class,
f is a second revenue class,
C is the excess capacity,
E is an expectation operator, $p_d$ is an economic value for mobile units associated with revenue class d, $p_f$ is an economic value for mobile units associated with revenue class f, y is the protection level, $D_d$ is a demand associated with mobile units associated with revenue class d, and $D_f$ is a demand associated with mobile units associated with revenue class f, assuming the economic value for mobile units associated with revenue class d is greater than the economic value for mobile units associated with revenue class f.

\* \* \* \* \*